| United States Patent [19] | [11] 4,218,521 |
|---|---|
| Putt et al. | [45] Aug. 19, 1980 |

[54] METAL-HALOGEN BATTERY HAVING REDUCED DENDRITE GROWTH

[75] Inventors: Ronald A. Putt, Palatine; Mark J. Montgomery, Lake Zurich, both of Ill.

[73] Assignee: Electric Power Research Institute, Inc., Palo Alto, Calif.

[21] Appl. No.: 967,863

[22] Filed: Dec. 8, 1978

[51] Int. Cl.² ............... H01M 2/14; H01M 12/06
[52] U.S. Cl. .............................. 429/39; 429/70; 429/101
[58] Field of Search ............ 429/101, 38, 39, 15, 429/70, 51, 34, 81, 105

[56] References Cited

U.S. PATENT DOCUMENTS

| 3,049,578 | 8/1962 | Jonsson et al. | 429/81 |
| 3,472,699 | 10/1969 | Jackley et al. | 429/81 |
| 3,642,538 | 2/1972 | Zito | 429/101 |
| 3,713,888 | 1/1973 | Symons | 429/101 |

Primary Examiner—Donald L. Walton
Attorney, Agent, or Firm—Flehr, Hohbach, Test

[57] ABSTRACT

A metal-halogen battery, specifically a zinc-bromine battery of the rechargeable type, is disclosed herein and includes a housing, spaced positive and negative electrode plates located within the housing and an arrangement for providing continuous flow of electrolyte solution through the housing between the plates. This battery also includes a network of electrically non-conductive projecting ribs which engage the negative electrode plate for providing a fixed spacing between the two plates but which, at the same time, are specifically designed to reduce dendrite growth.

7 Claims, 8 Drawing Figures

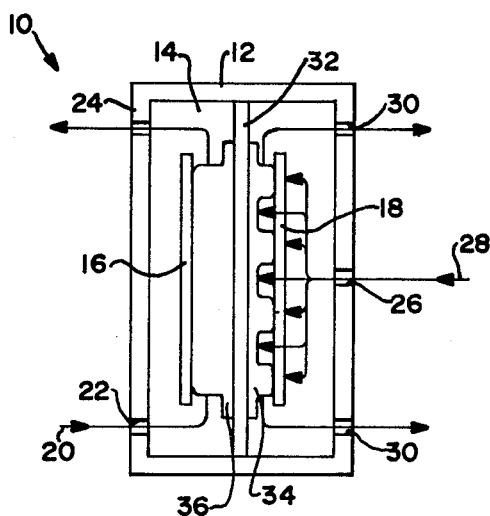
FIG.—1
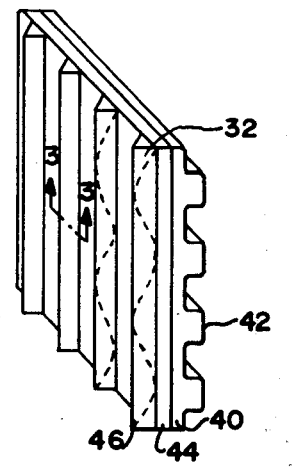
FIG.—2
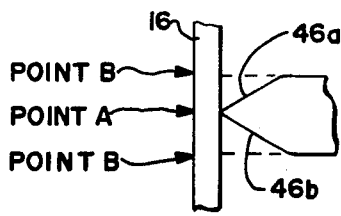
FIG.—3
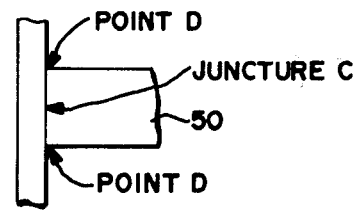
FIG.—5
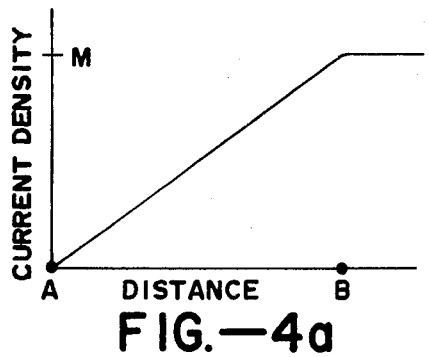
FIG.—4a
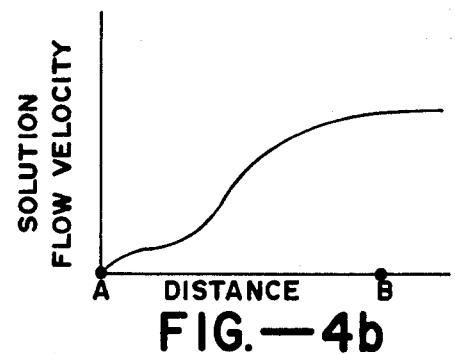
FIG.—4b
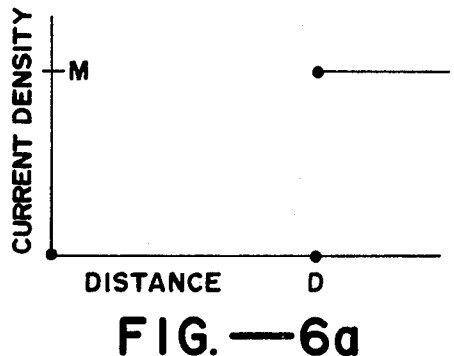
FIG.—6a
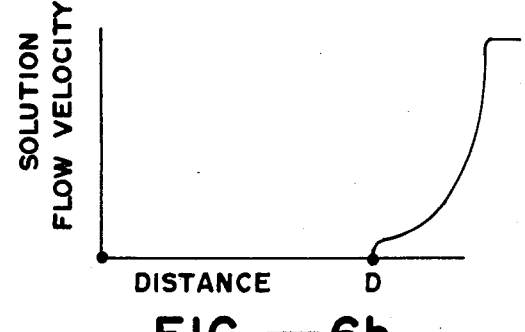
FIG.—6b

METAL-HALOGEN BATTERY HAVING REDUCED DENDRITE GROWTH

BACKGROUND OF THE INVENTION

The present invention relates generally to metalhalogen batteries and more particularly to a battery of this general type which is substantially free of dendrite growth throughout its operating life.

A typical zinc-bromine or zinc-chlorine battery of the rechargeable type includes a pair of spaced apart, confronting electrode plates located within a housing, specifically a positive electrode plate constructed of porous titanium or graphite and a negative electrode plate constructed of solid titanium or graphite. One such battery system is disclosed in Applicants copending United States Patent Application Ser. No. 841,391, filed Oct. 12, 1977 now U.S. Pat. No. 4,162,351 and assigned to the Assignee of the present application. In the zinc-chlorine battery, a single stream of electrolyte solution may be passed through the housing and a separator is not required.

One major problem in the development of a rechargeable metal-halogen battery of the general type just described has resided in the inability to reliably eliminate or control dendrite growth. More specifically, in this type of battery, it is necessary to provide the proper spacing between the electrode plates which, in turn, requires the utilization of some form of rigid spacing ribs between the plates, particularly for electrode dimensions of practical interest (i.e. plates having large surface areas and thin cross-sections) where uncontrollable bowing may otherwise result. However, studies have shown that there is a tendency for dendrite growth to propagate along the region of contact between the separator ribs and the negative electrode which is in contact with the ribs. Applicants have found this to be a result of electrolyte flow stagnation in this region of contact, which nonetheless receives approximately the same current density as the rest of the electrode. In other words, Applicants have found that reduced solution flow at the rib contacting region of the negative electrode at the operating current density of the battery has resulted in dendritic metal deposition. As will be seen hereinafter, the present invention minimizes and preferably eliminates dendrite growth by providing region located adjacent each rib which region displays insufficient current density and/or too high of an electrolyte flow rate to support dendrite growth.

OBJECTS AND SUMMARY OF THE INVENTION

One object of the present invention is to provide a metal-halogen battery of the general type described above and yet one which does not result in dendrite growth along its spacing ribs.

A more specific object of the present invention is to provide a metal-halogen battery which displays insufficient current density and/or too high of an electrolyte solution flow rate at the potential dendrite growth regions adjacent the spacing ribs to support dendrite growth thereat.

Still another object of the present invention is to eliminate dendrite growth in an uncomplicated, economical and reliable way without utilizing any components over and above those otherwise required by the battery.

The metal-halogen battery disclosed herein is similar in most respects to the battery described above and, hence, includes a housing, two spaced apart, confronting electrode plates, a positive plate and a negative plate and means for providing a continuous flow of electrolyte solution through the housing. The battery also includes a plurality of electrically non-conductive, spaced projections or longitudinal ribs normal to the negative plate and having free ends in engagements with the confronting face thereof.

These projections aid in maintaining the two electrode plates spaced from one another. In accordance with the present invention, each of these projections is shaped such that the current density of the battery at the negative plate directly adjacent the plate engaging free end of the projection (e.g. the region of potential dendrite growth) is sufficiently small to prevent dendrite growth at its free end regardless of the flow rate of the electrolyte solution thereat. In an actual working embodiment, this is accomplished by making each of the projections (actually longitudinal ribs) wider in cross-section at predetermined points spaced from its plate engaging end than at the plate engaging end itself. Preferably at least a section of the projection cross-section including its plate engaging free end tapers outwardly from its free end in the direction away from the negative electrode plate.

BRIEF DESCRIPTION OF THE DRAWINGS

FIG. 1 is a vertical sectional view diagrammatically illustrating a metal-halogen battery, specifically a zinc-bromine battery designed in accordance with the present invention.

FIG. 2 is a perspective view illustrating certain inner components of the battery of FIG. 1 and particularly showing an electrode spacer member designed in accordance with the present invention to eliminate the propagation of dendrite growth along the spacer member.

FIG. 3 is an enlarged cross-sectional view of a spacing rib comprising part of the spacer member of FIG. 2, the rib being shown in contact with a negative electrode plate of the battery illustrated in FIG. 1.

FIG. 4a is a graphic illustration of how current density within the battery of FIG. 1 in the region of contact adjacent the spacing rib and negative electrode plate illustrated in FIG. 3 varies with distance from the point of contact, point A to a lateral point B.

FIG. 4b is a graphic illustration of how the flow velocity of electrolyte solution passing across the negative electrode plate varies with distance from the contact point A to the same lateral point B in FIG. 3.

FIG. 5 is a view similar to that of FIG. 3 but illustrating a rib design which does not eliminate dendrite growth adjacent the rib contacting region, specifically juncture C.

FIG. 6a is a graphic illustration of the current density at points D immediately adjacent the juncture C of the rib illustrated in FIG. 5 and lateral points therefrom.

FIG. 6b is a graphic illustration of the change in electrolyte solution flow rate from point D and points laterally therefrom.

DETAILED DESCRIPTION

Turning now the drawing, wherein like components are designated by like reference numerals throughout the various figures, a rechargeable zinc-bromine battery is diagrammatically illustrated in FIG. 1 and generally designated by the reference numeral 10. This battery is shown including a conventional housing 12 defining an inner chamber 14. A negative electrode plate 16 constructed of solid titanium is fixedly located within chamber 14 near one side of the housing. A positive electrode plate 18 constructed of porous, sintered titanium, suitably catalized for bromine electrode reaction is also located within the housing in spaced, confronting relationship with the negative electrode.

A continuous circulating and recirculating stream of electrolyte solution, for example a solution composed of zinc bromide (the electro-chemically active species), potassium chloride (the supporting electrolyte) and water (the solvent) is provided across the confronting face of electrode 16, as indicated by arrow 20. A suitable pump arrangement for electrolyte solution (not shown) is utilized to accomplish this and, in this respect, cooperates with an appropriate inlet 22 and outlet 24 provided through the housing wall. A second pump arrangement (not shown) is provided for circulating and recirculating a second stream of electrolyte solution into chamber 14 through an appropriate inlet 26. As indicated by the arrows 28 this second stream of electrolyte solution passes through the porous electrode plate 18 and back out of chamber 14 through outlets 30. A micro-porous separator 32 is located within housing 12 between the two electrode plates and serves to separate the chamber for preventing the negative stream 20 of electrolyte solution from mixing with the positive stream 28 and to slow the diffusion of bromine from the positive side to the negative side. In an actual working embodiment, a DARAMIC separator manufactured by W. R. Grace Company and having a porous silica phase imbedded in a polyethylene binder has been utilized.

The various components making up battery 10 thus far described (with or without illustration) are conventional and may be provided by those with ordinary skill in the art. All of these components and others have been discussed to some degree in the previously recited co-pending application. Moreover, it is to be understood that the battery may include other conventional components including, for example, fastening means for maintaining the electrode plates and separator in the positions illustrated and the appropriate plumbing necessary to carry the separate streams of electrolyte solution into and out of housing 12.

As stated previously, it may be necessary to provide proper spacing between the two electrode plates, particularly where electrode and separator dimensions are within ranges of practical interest, for example those defining large areas and thin cross-sections. As illustrated in FIG. 1, battery 10 includes two spacing members, a positive spacing member 34 located between the positive electrode plate 18 and separator 32 and a negative spacing member 36 located between the negative electrode plate 16 and the separator. Inasmuch as there is no problem with dendrite growth on the positive electrode plate, the spacing member 34 may be of any conventional type so long as it functions in the manner intended, that is, to maintain predetermined space between the positive electrode and separator 32 without otherwise affecting the normal operation of battery 10 and certainly without disrupting stream 28 of electrolyte solution. As illustrated in both FIGS. 1 and 2, this spacing member is comprised of a main body 40 which may be a solid rectangular plate or a grid network located against the positive face of separator 32 and a plurality of longitudinally extending ribs 42 which project out from and are supported by the main body. The cross-sectional shape of these longitudinal ribs may by of any convenient design. For example, they may be relatively flat, similar to the rib shown in FIG. 5 (to be discussed) or they can be similar in shape to the ribs of spacing member 36 to be discussed below. In any event, these projecting ribs are designed to engage the confronting face of positive electrode plate 18.

Having described spacing member 34, attention is now directed to spacing member 36 which is designed in accordance with the present invention. As illustrated both in FIGS. 1 and 2, this spacing member, like spacing member 34, includes a main body 44 which is in the form of a grid shaped web and which is adapted to rest against the negative confronting surface of separator 32. This web supports a plurality of projections 46 in the form of longitudinally extending, laterally spaced ribs which are parallel to one another and which parallel electrolyte solution stream 20 as the latter moves across the confronting face of negative electrode 16. The ribs are constructed of an electrically non-conductive material, specifically polypropylene in an actual working embodiment and, in this embodiment, web 44 is constructed of the same material and, in fact, is integrally formed with the ribs solely for the purpose of supporting the latter relative to one another.

As illustrated best in FIG. 3, each of the ribs or projections extends out from web 44 a sufficient distance to engage the confronting face of negative electrode plate 16 at its free end 46a. Moreover, in accordance with the present invention, each projection has a cross-section which is wider at predetermined points between end 46a and web 44 than at the plate engaging free end itself. In an actual working embodiment, at least a section of the rib (in cross-section) including end 46a tapers outwardly from its free end towards web 44 as indicated at 46b to accomplish this. The exact degree of taper will depend upon certain factors to be discussed below. However, in an actual working embodiment, the taper is about 45° to a line normal to plate 16.

The reason for providing taper 46b or other configurations which result in a wider intermediate rib section (in cross-section) than the width at its free end is to reduce the current density in the region directly adjacent to the contact juncture between the free end of each rib and negative plate 16. This is best exemplified in FIG. 4a which graphically illustrates the current density from the contact juncture, point A, to a lateral point B which coincides with the outermost surface of the rib. First, it should be noted that the current density at the point of contact is zero and that some maximum value M (the operating value of the battery) exists at point B. At the points therebetween, that is, within the tapering region 46b, from point A to point B, the current density increases from zero to the maximum value M. For purposes of illustration, this increase has been shown as a straight line. However, it is to be understood that this is not necessarily the case and that the exact value for current density at any given point within the tapering region will depend upon the exact shape and size of the ribs as well as the overall operation of the battery itself and can be readily determined if necessary. However, the significance of this graph resides in the fact that the current directly adjacent point A is relatively low compared to the current density beyond the taper region. As will be discussed below, it is important to maintain the current density in the region sufficiently small to prevent dendrite growth at those points adjacent to and along the contact juncture where the electrolyte solution flow rate is in a sufficient state of stagnation to support such growth.

Turning specifically to FIG. 4b, it can be seen that there is absolutely no flow rate across the contact juncture A which, of course, is quite obvious. However, because of the way in which the rib obstructs the flow of electrolyte solution (stream 20) the velocity of flow is significantly less at points directly adjacent the contact juncture than at lateral points therefrom. This degree of stagnation will in certain cases support dendrite growth unless the current density in that region is sufficiently low to counter such growth. By providing ribs 44 having a narrower contact surface (in cross-section) as compared to another point along its length, the current density directly adjacent the contact juncture and point of stagnation is reduced. In order to completely eliminate dendrite growth, the current density at this point must be reduced sufficiently to prevent such growth. The exact amount of reduction required will vary depending upon the characteristics of the battery itself and can be determined.

For purposes of explanation, the rib configuration just described should be compared with one which does not include the narrower contact juncture, specifically a rib 50 which is illustrated in FIG. 5. As seen in this figure, rib 50 is of uniform cross-section from its plate engaging end (juncture C) rearward. As a result, the current density at points D, that is, the points directly adjacent juncture C is equal to that of the maximum operating current density M of the battery, as indicated in FIG. 6a. However, at the same time, the velocity of flow rate in the vicinity of point D is significantly less than points laterally spaced therefrom. As a result, it is possible that dendrite growth will be initiated at that point and propagate along the length of the rib in contrast to the elimination of such a possibility with regard to the rib configuration of the present invention.

The present invention has been described with respect to a zinc-bromine battery. It is to be understood that the present invention is equally applicable to other metal-halogen batteries including for example metal-chlorine batteries. In this latter case, a separator 32 would not be necessary and a single stream of electrolyte fluid could be passed through the housing in a conventional manner. Accordingly, only one spacing member would be necessary and this spacing member could include a single web 40 or 44 carrying both the network of ribs 42 as well as ribs 46. Where, however, the present invention is utilized in a battery having a separator such as separator 32, it is to be understood that the separator itself could support each network of ribs, thereby eliminating the utilization of either web 40 or 44. In addition, while the present invention preferably contemplates the utilization of longitudinally extending ribs 44 having a tapering configuration described, the present invention also contemplates individual projections, for example, in the form of individual dimples having the required cross-sectional configuration to eliminate dendrite growth. Some of these dimples are shown by dotted lines in FIG. 2.

What is claimed is:

1. A metal-halogen battery, comprising:
   (a) a housing;
   (b) a positive electrode plate located within said housing;
   (c) a negative electrode plate located within said housing in spaced relation with and confronting said positive plate;
   (d) means for providing a continuous flow of electrolyte solution through said housing and past the confronting face of said negative plate; and
   (e) means for maintaining uniform spacing between said plates, said means including
      (i) a main body located between said plates in a fixed position relative to said positive plate, and
      (ii) a plurality of electrically non-conductive, spaced projections, each of which extends out from said main body a distance sufficient to engage the confronting face of said negative plate at its free end, each of said projections having a cross-section which is wider at predetermined points between said engaging free end and main body than at its plate engaging free end.

2. A battery according to claim 1 wherein at least a section of the cross-section of each of said projections including said plate engaging free ends tapers outwardly from said free end toward said main body.

3. A battery according to claim 2 wherein the tapering section of each projection tapers at an angle of about 45° with the axis of the projection.

4. A battery according to claim 1 wherein said main body is in the form of an electrically non-conductive grid sufficiently open to allow said electrolyte solution to pass therethrough, said grid supporting said projections on one side thereof.

5. A battery according to claim 4 including:
   (a) means for providing a second continuous flow of electrolyte solution through said housing and through said positive electrode plate; and
   (b) an electrolyte solution separator between said space maintaining means and said positive electrode for separating said firstmentioned and second electrolyte solutions from one another, said separator engaging said main body on one of its sides and including means engaging the confronting face of said positive plate on its other side.

6. A battery according to claim 1 wherein each of said projections extends longitudinally along the length of and parallel with the confronting face of said negative electrode plate.

7. A metal-halogen battery, comprising:
   (a) a housing;
   (b) a positive electrode plate located within said housing;
   (c) a negative electrode plate located within said housing in spaced relation with and confronting said positive plate;
   (d) means for maintaining a fixed spacing between said plates, said space maintaining means including a plurality of electrically non-conductive, spaced projections normal to said negative plate and having free ends in engagement with the confronting face thereof, each of said projections having at least a segment which is spaced from its free end and which is wider in cross section than said free end such that the current density of the battery at said negative plate directly adjacent the plate engaging free end of each projection is sufficiently small to prevent dendrite growth at said free end regardless of the flow rate of said electrolyte solution thereat.

* * * * *